May 22, 1962
A. M. KLEIN
3,035,853
VEHICLE SUSPENSION AND STABILIZING SYSTEM
Filed Dec. 10, 1958
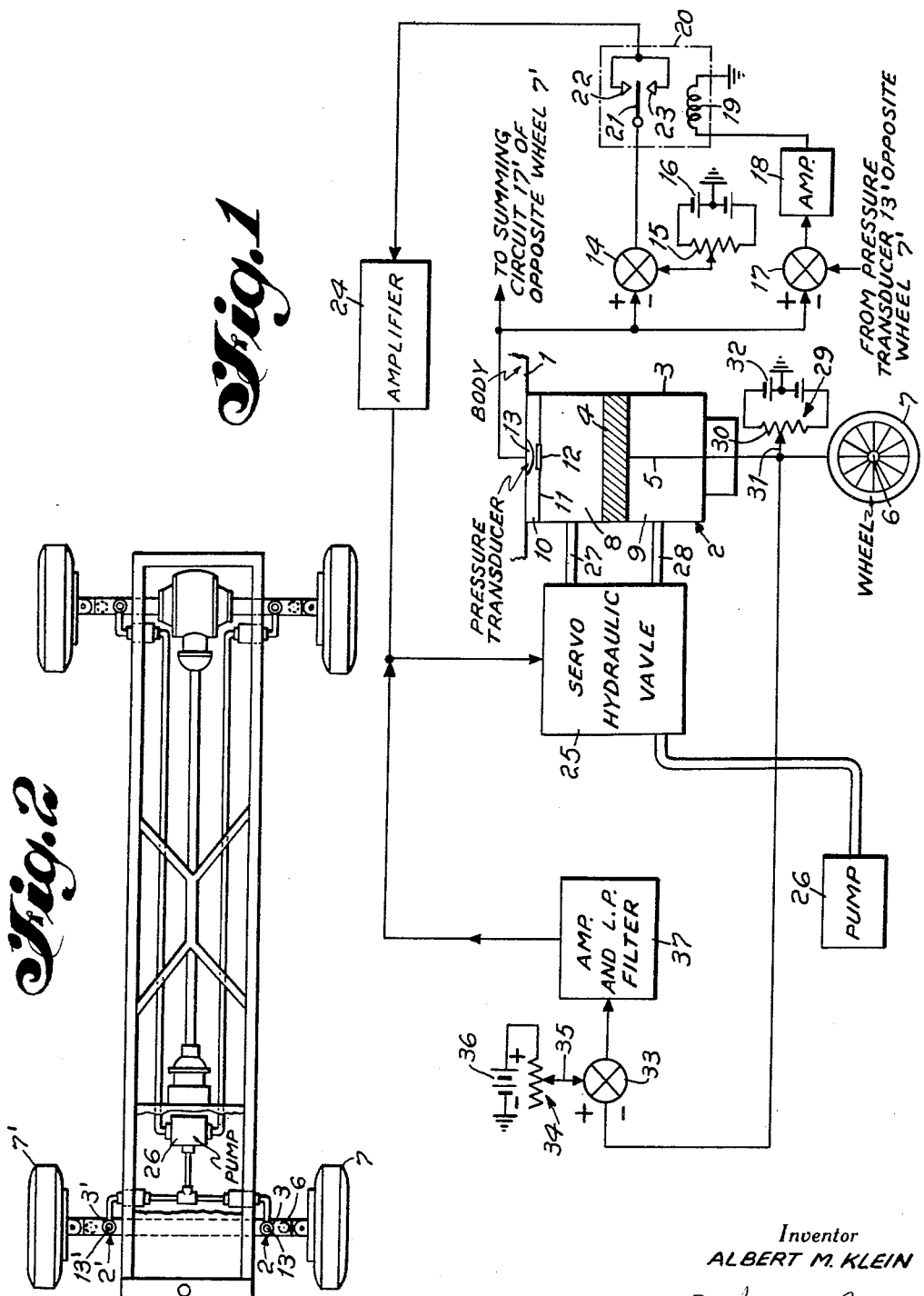
Inventor
ALBERT M. KLEIN
By *[signature]*
Attorney United States Patent Office 3,035,853
Patented May 22, 1962

3,035,853
VEHICLE SUSPENSION AND STABILIZING
SYSTEM
Albert M. Klein, Cedar Grove, N.J., assignor to International Telephone and Telegraph Corporation, Nutley, N.J., a corporation of Maryland
Filed Dec. 10, 1958, Ser. No. 779,492
15 Claims. (Cl. 280—124)

This invention relates to a suspension and stabilizing system for automotive vehicles and more particularly to a suspension system for maintaining the body of the vehicle in a substantially stable condition.

Suspension systems for vehicles and particularly for automobiles are theoretically designed to give the maximum in smooth riding for the passenger regardless of the roughness of the road over which the vehicle is traveling. Many schemes have been offered and incorporated in vehicles to provide this ideal smooth ride but it is apparent that much room for improvement still remains. Means have been suggested for correcting unbalance in automobile suspension which is caused by turning of the vehicle or road irregularities that depend upon differential pressures produced in the hydraulic suspension to produce counteracting fluid flow to equalize the pressures and to restore the vehicle balance. Sensing means have been suggested, such as pendulums which are moved from an equilibrium condition by unbalancing forces and thereupon operate valves or other adjusting devices to equalize the pressures in the cylinders of hydraulic suspension in an effort to provide a level ride. However, these arrangements are open loops which are slow in sensing and in providing the necessary counteracting forces so that a great deal of the unbalance which is sought to be corrected still remains after the correction has been attempted.

An object of this invention is to provide a suspension and stabilizing system for maintaining the body of the car in a substantially stable condition during the operation thereof regardless of the condition of the road over which the vehicle is traveling.

Another object is to provide such a system in which the correcting forces operate rapidly and efficiently through the use of a feedback control.

A feature of this invention is a suspension system for a vehicle for maintaining the body of the vehicle in a substantially stable condition during the operation thereof that comprises for each wheel of the vehicle suspension means coupling the body to the wheel. Means are provided to sense the change in the displacement of the wheel with respect to the body and means responsive to this change exceeding a given reference value to apply a force to the suspension system counteracting the change.

Another feature is that a pair of wheels for a vehicle is utilized for comparison to determine whether a change in the suspension means coupling each wheel of the pair to the body is of such magnitude as to require a force to counteract the change. Means are provided at each wheel to sense a change in the relative displacement of the wheel with respect to the body and the output of the sensing means of the two wheels is compared and further means are provided responsive to the output of the comparing means at a certain level for applying a force counteracting the change of the wheel if the change exceeds a given reference value.

Still another feature is that the sensing means produce an error voltage when the vehicle strikes an obstruction in the road and means responsive to this error voltage actuates a servo hydraulic valve to provide a correcting force to the hydraulic suspension of the vehicle.

A further feature is that additional means are provided to sense changing vehicle body height above a predetermined level which are caused by variable loading factors and, when compared with a reference factor, the difference is used to actuate the servo hydraulic valve to provide the proper correction force to the hydraulic suspension to correct for these factors.

The above-mentioned and other features and objects of this invention will become more apparent by reference to the following description taken in conjunction with the accompanying drawings, in which:

FIG. 1 is a block diagram of a suspension system for one wheel of a multi-wheel vehicle embodying this invention; and FIG. 2 is a plan view of the assembly of the frame of the vehicle to the wheels.

Referring now to FIGS. 1 and 2, there is shown in simplified form a portion of the body 1 of a vehicle to which is coupled a hydraulic suspension device 2 composed of a cylinder 3 and a piston 4 movable therein. A piston rod 5 couples the piston 4 to the axle 6 of a wheel 7 of the vehicle. The piston 4 separates the cylinder 3 into two compartments 8 and 9 which are filled with hydraulic fluid at the necessary pressure to provide the desired suspension for the body of the vehicle. A third compartment 10 of the hydraulic device 2 is separated from the compartment 8 by means of a dividing member 11. In the center of the dividing element 11 is disposed a diaphragm 12 made of rubber or any other suitable flexible material. Inside the compartment 10 and on the top wall thereof adjacent the diaphragm 12 is disposed a pressure sensitive transducer 13. The compartment 10 is filled with air at a given pressure when the body of the car is at the required level condition. The diaphragm 12 is responsive to the variation in the pressure of the hydraulic fluid in the compartment 8 when the piston 4 moves up or down within the cylinder 3. This movement of the diaphragm in turn causes corresponding pressure increases or decreases in the compartment 10 which thereby actuates the pressure transducer 13 to produce a corresponding fluctuating electrical output. The output of the pressure transducer 13 is coupled to a summing circuit 14 to which is also coupled a reference voltage which is obtained from a suitable point on a fixed resistance 15 to the ends of which is coupled a source of electrical energy 16. This reference voltage is set at the correct level at which it is desired the hydraulic pressure of the suspension means should be maintained, and when the output of the pressure transducer is at that level, no output of the summing circuit 14 will result. The function of the summing circuit 14 is to subtract the reference voltage output of the resistor 15 from the output of the pressure transducer 13 to obtain thereby a difference voltage or error voltage which is indicative of the amount of correction that is required to bring the hydraulic cylinder to the correct operating level. The output of the pressure transducer 13 is also coupled to a second summing or subtracting circuit 17. To this summing circuit is coupled the output of the pressure transducer 13' of the opposite wheel 7' of the vehicle. The output of the summing circuit 17, which is the difference between the two inputs is coupled to an amplifier 18 and the output of the amplifier 18 is fed into the energizing coil 19 of a polar relay 20. The output of the summing circuit 14 is coupled to the armature 21 of the polar relay 20 having two output contacts 22 and 23 which are coupled together to provide a common output. The polar relay is also provided with a middle or null position so that no output can be produced from the polar relay 20 if the voltage fed to the energizing coil 19 is insufficient to cause it to operate. The output of the polar relay 20 is coupled to an amplifier 24 and the output thereof is fed into a servo hydraulic valve 25 of the type known to the art. A pump 26 supplies the servo hydraulic valve 25 with the pressurized hydraulic fluid and the hydraulic output of the valve 25 is coupled to the compartments 8 and 9 of the hydraulic suspension device 2 by means of passages 27 and 28. The pressure transducer 13 together with the electrical units described and the servo hydraulic valve constitute a feedback constant pressure loop which acts to reduce the effects of vertical acceleration forces on the body of the vehicle.

A potentiometer device 29, of which the resistance element 30 is coupled to the cylinder 3 of the hydraulic device 2 and a movable arm 31 coupled to the piston 5, in association with a battery 32, shown schematically, provides a variable voltage output as the body 1 moves relative to the wheel 7. This varying voltage output is coupled to a summing or subtracting circuit 33 to which is also fed a second reference voltage derived from a potentiometer device 34 of which the arm 35 is coupled to the summing circuit 33. This reference voltage is derived from a battery 36 coupled to the potentiometer 34. The potentiometer 34 may be installed on the dashboard of the vehicle with the proper markings so that the driver of the vehicle can adjust the chassis height to a desired level by rotation of the potentiometer arm. Thus, it is possible to provide for a variation of the chassis height, depending upon the loading of the car, as the driver desires. The output of the summing circuit 33, which is the difference between the reference voltage output of the potentiometer 34 and the output of the potentiometer 29, is then fed to an amplifier and low pass filter 37 and the output of the amplifier and low pass filter 37 is coupled to the servo hydraulic valve 25.

In the operation of this invention when the wheel 7 strikes an obstruction, such as a bump in the road, the piston will move upward thereby increasing the pressure of the fluid in the compartment 8 which in turn through the diaphragm 12 will increase the pressure in the compartment 10 and actuate the pressure transducer 13 to produce a varying electrical output. This voltage output is then compared in the summing circuit 14 with the reference output voltage of the resistance 15 and the difference between these two voltages will be fed into the armature 21 of the polar relay 20. The output of the pressure transducer 13 is also transmitted to the summing circuit 17 and there compared with the voltage output of the pressure transducer 13' of the opposite wheel 7'. In this embodiment the wheel 7 is one of the front wheels and 7' is the opposite front wheel. The difference of the two voltage inputs of the summing circuit 17 is coupled to the input of the amplifier 18, and the output of the amplifier 18 will energize the coil 19 of the polar relay 20. The operating point of the amplifier 18 may be set at such a level that a desired minimum voltage output of the summing circuit 17 will produce a desired minimum voltage output of the amplifier 18 that will be sufficient to energize the coil 19. It is desirable to provide the correcting forces to the hydraulic suspension only when the error voltage producing conditions are of sufficient magnitude to be disturbing to the average person. Any irregularity in the road which will transmit effects to either or both wheels 7 and 7' of small non-disturbing magnitude may be ignored for correction purposes. Proper biasing of the amplifier 24 or the servo hydraulic valve 25 can set the operating level to correct disturbances which affect the occupant of the vehicle. If the result of the road irregularity is a relative displacement of the two wheels 7 and 7' which will produce a voltage difference sufficient to energize the coil 19, then the error voltage output of the summing amplifier 14 will be transmitted through the polar relay to the amplifier 24. Because the two poles of the relay 20 are tied together, the output of the relay 20 will be the same as the input thereto regardless of the output polarity of the summing circuit 17. The output of the relay 20 after amplification in the amplifier 24 when applied to the torque motor coils of the servo valve will actuate the servo valve to supply the pressurized hydraulic fluid to the appropriate compartment 8 or 9 of the hydraulic cylinder 3 to move the piston 4 in the correct direction to counteract the disturbing force. It should be emphasized that the reference voltage output of the resistance 15 is indicative of the desired pressure to be maintained and the output of the pressure transducer 13 is proportional to the variations from the desired pressure which when compared with the reference voltage will produce an output whenever the pressure variations of the hydraulic suspension differs from the reference voltage.

The pressure transducing sensing means as described above is suitable for substantially rapid changes in the displacement of the vehicle body which may be caused by road discontinuities and variations as the vehicle travels over the road. The frequencies of these changes, of course, vary with the characteristics of the road irregularities and with the speed of the car. The greater the speed of the car and the closer together that the irregularities may be, then the greater the frequency; conversely, the slower the speed of the car and the greater the distance between irregularities, then the frequency will be much less. For instance, if the vehicle were traveling at a speed of 60 miles per hour over a road which has a ripple in the surface and the distance between the peaks of the ripple is 14 feet, then the frequency of the disturbance would be 6 c.p.s. The same vehicle traveling at a speed of 10 miles per hour would encounter a disturbing frequency of 1 c.p.s.; at approximately 20 miles per hour, 2 c.p.s.; at approximately 40 miles per hour, the disturbing frequency is 4 c.p.s. This is the disturbing condition that the pressure transducing means of this invention will sense and that the correcting features of this invention will counteract. Of course, it is obvious that there are road irregularities which will produce much greater disturbing frequencies to be corrected and also a condition where a vehicle may fall into a depression so that the output of the pressure transducer would be in the nature of a stepped voltage such as a long pulse. However, it is also desirable to compensate for discontinuities in vehicle riding which are slow acting in comparison with the fairly rapid effects road irregularities impose as described above. An example of such a discontinuity is the change in the loading when an automobile begins the ascent of a long and rather steep hill. A static leveling device is necessary to maintain a predetermined height of the car above the road under such load conditions. The desired height of the body is selected by the driver of the vehicle in the adjustment of the potentiometer 34. The voltage from the potentiometer 34 is indicative of the desired height and may be varied by the driver. This voltage is compared with the varying height of the vehicle body with respect to the wheels as determined by the potentiometer 29 in the summing circuit 33. The difference voltage output of the summing circuit 33 obtained by subtracting a reference voltage height from the varying voltage height is fed into the amplifier and low pass filter 37. The low pass filter is designed so that only the relatively long time variations will pass through the filter and therefore will only pass frequencies below those frequencies caused by road irregularities. To take our illustration of the road ripple, it may be desirable to fix the upper limit of the low pass filter at less than 1 c.p.s. All frequencies 1 c.p.s. and greater would then be corrected by means of the error voltage secured from the pressure transducer 13 and the pressure transducers for the other wheels of the vehicle. Any error voltage output of the summing circuit 33 having a frequency component of less than 1 c.p.s. would be passed through the low pass filter in amplified form and coupled to the servo hydraulic valve 25 to actuate the necessary hydraulic correction for the hydraulic suspension system. The resistance element 29, the summing circuit 33, the variable resistance element 34, the amplifier and low pass filter 37 and the servo hydraulic valve 25 form a feedback constant height loop which acts to maintain the vehicle in a level condition.

It should be understood that only one source of reference value for the desired pressure and one source of reference voltage for the desired height are necessary for all the wheels of the vehicle.

While I have described above the principles of my invention in connection with specific apparatus, it is to be clearly understood that this description is made only by way of example and not as a limitation to the scope of my invention as set forth in the objects thereof and in the accompanying claims.

I claim:

1. A suspension system for a vehicle for maintaining the body of said vehicle in a substantially stable condition during operation thereof comprising for each wheel of said vehicle suspension means coupling the body to the wheel, means to select a desired displacement of said wheel with respect to said body and to provide a given reference voltage indicative of said desired displacement, transducer means to sense a change in the displacement of the wheel with respect to the body and to produce a voltage indicative of said change and means responsive to said change voltage exceeding said given reference voltage to apply a force to said suspension system counteracting said change.

2. A suspension system for a vehicle according to claim 1 wherein said means responsive to said change voltage includes means coupled to the output of said sensing means for comparing said change voltage with said reference voltage to obtain an error voltage for controlling said counteracting force.

3. A suspension system for a vehicle for maintaining the body of said vehicle in a substantially stable position during operation thereof comprising a pair of wheels, suspension means coupling each of said wheels to said body and comprising for each wheel means to select a desired displacement of said wheel with respect to said body and to provide a given reference voltage indicative of said desired displacement, transducer means to sense a change in the relative displacement of said wheel with respect to the body and to produce a voltage indicative of said displacement, means to compare the change of displacement voltage of each said wheel with respect to the other wheel, means responsive to said comparison for producing an output when a given difference exists between the relative displacement of each said wheel and means responsive to said output and to a change in the displacement of each said wheel exceeding said given reference voltage, for applying a force counteracting the change of displacement of said wheel with respect to the body.

4. A suspension system for a vehicle for maintaining the body of said vehicle in a substantially stable position during operation thereof comprising a pair of wheels, suspension means coupling each of said wheels to said body and comprising for each wheel means to sense a change in the relative displacement of said wheel with respect to the body, first means to compare the change of displacement of each said wheel with respect to the other wheel, second means to compare the change of displacement of each said wheel with a given reference value, and means coupled to the output of said second comparison means and responsive to said first comparison to transmit a control output proportional to the output of said second comparison when the difference between the relative displacement of each said wheel with respect to the other exceeds a given amplitude and means responsive to said control output for applying a force counteracting the change of displacement of said wheel with respect to the body.

5. A suspension system for a vehicle according to claim 4 wherein said suspension means comprise hydraulic suspension means and said sensing means produce a voltage output responsive to variations in the pressure of said hydraulic suspension means.

6. A suspension system for a vehicle according to claim 5 wherein said first comparison means comprises a first summing circuit and the output of said first summing circuit is the difference between the voltage output of said sensing means of each wheel of said pair.

7. A suspension system for a vehicle according to claim 6 wherein said second comparison means comprises a second summing circuit and the output of said second summing circuit is the difference between the voltage output of said sensing means and a given reference voltage indicative of the desired pressure to be maintained in said hydraulic suspension means.

8. A suspension system for a vehicle for maintaining the body of said vehicle in a substantially stable position during operation thereof comprising a pair of wheels, hydraulic suspension wheels coupling each of said wheels to said body and comprising for each wheel a pressure sensitive transducer to sense a change in the hydraulic pressure of said suspension means indicating a change in the relative displacement of said wheel with respect to said body, a source of reference voltage indicative of a desired pressure, a first summing circuit, means coupling the outputs of said pressure transducers of both wheels of said pair to said first summing circuit to derive an output therefrom indicative of the difference between said outputs of said pressure transducers, a second summing circuit, means coupling the output of said pressure transducer and said source of reference voltage to said second summing circuit to derive therefrom an output indicative of the difference between the desired pressure and the actual pressure of said hydraulic suspension means, means responsive to a predetermined level of said output of said first summing circuit and the output of said second summing circuit to vary the pressure in said hydraulic suspension means in accordance with the variations of the output of said second summing circuit to maintain said body in said substantially stable condition.

9. A suspension system for a vehicle for maintaining the body of said vehicle in a substantially stable position during operation thereof comprising a pair of wheels, hydraulic suspension means coupling each of said wheels to said body and comprising for each wheel a pressure sensitive transducer to sense a change in the hydraulic pressure of said suspension means indicating a change in the relative displacement of said wheel with respect to said body, a source of reference voltage indicative of a desired pressure, a first summing circuit, means coupling the outputs of said pressure transducers of both wheels of said pair to said first summing circuit to derive an output therefrom indicative of the difference between said outputs of said pressure transducers, a second summing circuit, means coupling the output of said pressure transducer and said source of reference voltage to said second summing circuit to derive therefrom an output indicative of the difference between the desired pressure and the actual pressure of said hydraulic suspension means, a polar relay having an energizing coil, an armature and a plurality of outputs, first amplifier means coupling the output of said first summing circuit to said energizing coil whereby said coil will be energized by the output of said amplifying means when the output of said first summing circuit attains a minimum amplitude, means coupling the output of said second summing circuit to said armature, means coupling said plurality of outputs together, means responsive to the output of said polar relay to vary the pressure in said hydraulic suspension means in accordance with the variations in the output of said second summing circuit to maintain said body in said substantially stable condition.

10. A suspension system for a vehicle for maintaining the body of said vehicle in a substantially stable position during operation thereof comprising a pair of wheels, hydraulic suspension wheels coupling each of said wheels to said body and comprising for each wheel a pressure sensitive transducer to sense a change in the hydraulic pressure of said suspension means indicating a change in the relative displacement of said wheel with respect to said body, a source of reference voltage indicative of a desired pressure, a first summing circuit, means coupling the outputs of said pressure transducers of both wheels of said pair to said first summing circuit to derive an output therefrom indicative of the difference between said outputs of said pressure transducers, a second summing circuit, means coupling the output of said pressure transducer and said source of reference voltage to said second summing circuit to derive therefrom an output indicative of the difference between the desired pressure and the actual pressure of said hydraulic suspension means, a polar relay having an energizing coil, an armature and a plurality of outputs, first amplifier means coupling the output of said first summing circuit to said energizing coil whereby said coil will be energized by the output of said amplifying means when the output of said first summing circuit attains a minimum amplitude, means coupling the output of said second summing circuit to said armature, means coupling said plurality of outputs together, a servo hydraulic valve, second amplifier means coupling the output of said polar relay to the actuating coils of said servo hydraulic valve, a hydraulic pump, means coupling said hydraulic pump to said hydraulic valve, means coupling the hydraulic outputs of said hydraulic valve to said hydraulic suspension means whereby the error voltage output of said second summing coil will pass through said polar relay when the output of said first summing circuit is at least of said minimum amplitude and energizes said energizing coil and will cause said servo hydraulic valve to vary the pressure in said hydraulic suspension means in accordance with the variations of said error signal to maintain said body in said substantially stable condition.

11. A suspension system for a vehicle for maintaining the body of said vehicle in a substantially stable position during operation thereof comprising a pair of wheels, hydraulic suspension means coupling each of said wheels to said body and comprising for each wheel first means to sense a change in the pressure of said hydraulic suspension means indicative of a change in the relative displacement of the wheel with respect to the body and to produce a voltage indicative of said change, means responsive to a change in said pressure exceeding a given reference voltage to apply a force to said hydraulic suspension means counteracting said change, means to select a desired height of said wheel with respect to said body and to provide a given reference voltage indicative of said desired height, means to sense a variation in the height of said body relative to said wheel and means responsive to a variation exceeding said predetermined voltage to apply a force to said suspension means counteracting said variation.

12. A suspension system for a vehicle according to claim 11 wherein said means to sense said variation comprises a first variable resistor having a resistance element and a conductive arm slidable thereon, the resistance element being movable with the body and the conductive arm being movable with the wheel, and a source of electrical energy coupled to said first variable resistor to produce an output at said conductive arm when a variation occurs in the height of said body with respect to said wheel.

13. A suspension system for a vehicle according to claim 12 wherein said means responsive to said variation comprises a second variable resistor, a source of electrical energy coupled thereto, a summing circuit, means coupling the outputs of said first and second variable resistors to said summing circuit to derive therefrom a difference voltage indicative of a variation between the actual height of said body and the desired height of said body with respect to the wheels as determined by the output of said second variable resistor.

14. A suspension system for a vehicle for maintaining the body of said vehicle in a substantially level condition during operation thereof comprising for each wheel of said vehicle hydraulic suspension means coupling said wheel to said body, means to select a desired height of said wheel with respect to said body and to provide a given reference voltage indicative of said desired height, transducer means to sense a variation in the height of said body relative to said wheel and to produce a voltage indicative of said height variation and means responsive to a variation exceeding said predetermined voltage to apply a force to said suspension means counteracting said variation.

15. A suspension system for a vehicle for maintaining the body of said vehicle in a substantially level condition during operation thereof comprising for each wheel of said vehicle hydraulic suspension means coupling said wheel to said body, means to sense a variation in the height of said body relative said wheel consisting of a first variable resistor having a resistance element and a conductive arm slidable thereon, the resistance element being movable with the body and the conductive arm being movable with the wheel and a source of electrical energy coupled to said first variable resistor to produce an output at said conductive arm when a variation occurs in the height of said body with respect to said wheel, a second variable resistor and a source of electrical energy coupled thereto to derive therefrom a voltage indicative of a predetermined height of said body with respect to said wheel, a summing circuit, means coupling the outputs of said first and second variable resistors to said summing circuit to derive therefrom a difference error voltage indicative of any variation between the actual height of said body and the desired height of said body with respect to the wheel, a servo hydraulic valve, an amplifier and low pass filter coupling the output of said summing circuit to said servo hydraulic valve, a hydraulic pump, means coupling said hydraulic pump to said hydraulic valve, means coupling the hydraulic outputs of said hydraulic valve to said hydraulic suspension means whereby the error voltage output of said summing circuit will cause said servo hydraulic valve to vary the pressure in said hydraulic suspension means in accordance with the variations of said error signal to maintain said body in said substantially level condition.

References Cited in the file of this patent
UNITED STATES PATENTS

| | | |
|---|---|---|
| 1,179,015 | McCrosson | Apr. 11, 1916 |
| 2,787,474 | Brueder | Apr. 2, 1957 |
| 2,836,431 | Brueder | May 27, 1958 |
| 2,929,640 | Faiver | Mar. 22, 1960 |
| 2,939,723 | Wisniewski | June 7, 1960 |